April 29, 1952     I. C. CRIMMINS     2,594,403
SERVING UTENSIL
Filed Nov. 23, 1946
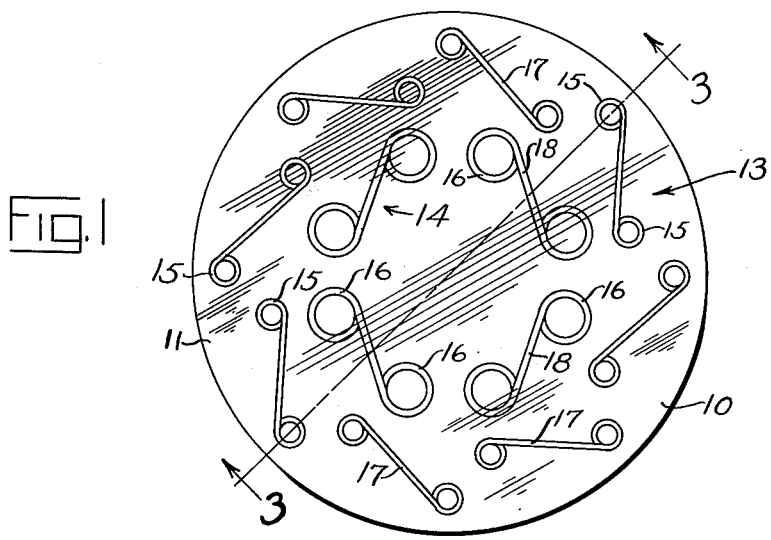
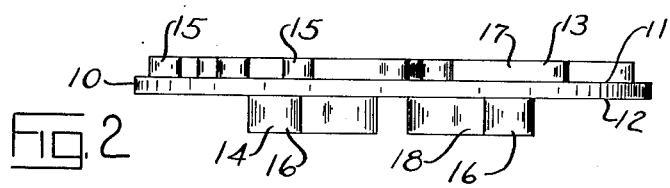
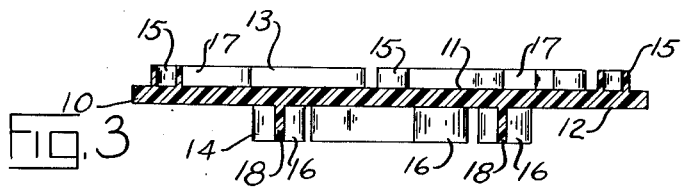
INVENTOR
INEZ C. CRIMMINS
BY *D. H. Braddock*
ATTORNEY Patented Apr. 29, 1952

2,594,403

UNITED STATES PATENT OFFICE 2,594,403

SERVING UTENSIL

Inez C. Crimmins, Minneapolis, Minn.

Application November 23, 1946, Serial No. 712,034

2 Claims. (Cl. 65—15)

This invention has relation to a utensil or implement adapted to be employed for the purpose of serving food.

An object of the invention is to provide a utensil or implement for receiving articles of food to be served which will be of simple, inexpensive, unique and improved character.

A further object is to provide a serving utensil which will consist of a holder having oppositely disposed surfaces each of which will be capable of receiving articles of food in position to be served and first and second means adapted to be selectively employed to support said holder so that either of its oppositely disposed food receiving surfaces can be in "up" position.

A further object is to provide a serving utensil which will consist of a holder having oppositely disposed surfaces for receiving articles of food and first and second means at opposite sides of said holder, adjacent to said oppositely disposed surfaces, respectively, adapted to be selectively employed to cause the holder to be capable of use either side up.

A further object is to provide a serving utensil which will consist of a holder for articles of food adapted to be applied to use either side up and first and second means adapted to be selectively employed to cause said holder to be supported with either of oppositely disposed food receiving surfaces of the holder facing upwardly.

A further object is to provide a serving utensil which will consist of a holder having first and second oppositely disposed surfaces each adapted to be capable of receiving articles of food and first and second means adapted to be selectively employed to cause said holder to be supported with either the first or the second of said opposite food receiving surfaces facing upwardly, and in which serving utensil the first means for supporting the holder will be situated adjacent to a marginal portion of the first food receiving surface in substantially spaced relation to an intermediate portion of said first food receiving surface and the second means for supporting said holder will be situated at an intermediate portion of the second food receiving surface in substantially spaced relation to a marginal portion of said second food receiving surface, whereby when the holder is supported with its first food receiving surface facing upwardly there will be a food receiving area of said first food receiving surface disposed interiorly of the first holder supporting means at and adjacent to said intermediate portion of the first food receiving surface and when said holder is supported with its second food receiving surface facing upwardly there will be a food receiving area of said second food receiving surface disposed exteriorly of the second holder supporting means at and adjacent to said marginal portion of the second food receiving surface.

And a further object is to provide a serving utensil, consisting of a holder including oppositely disposed food receiving surfaces and first and second supporting means for and bearing relation to said holder as set forth, wherein each of said first and second holder supporting means will be constituted as a plurality of spaced apart receivers or candlesticks for removably mounting candles upon said oppositely disposed food receiving surfaces, respectively, of the holder.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification,

Fig. 1 is a plan view of a serving utensil made according to the invention as it would appear from above in Fig. 2;

Fig. 2 is a side or edge elevational view; and

Fig. 3 is a sectional view taken on line 3—3 in Fig. 1.

With respect to the drawing and the numerals of reference thereon, the new and improved serving utensil consists of a holder 10 having first and second oppositely disposed surfaces, denoted 11 and 12, respectively, each of which is for receiving articles of food to be served, and first and second means, designated 13 and 14, respectively, adapted to be selectively employed to cause said holder to be supported with either the first food receiving surface 11 or the second food receiving surface 12 in "up" position; that is, facing upwardly.

As disclosed, the holder 10 is of circular configuration, although said holder could be of other preferred outline. The first and second oppositely disposed food receiving surfaces 11 and 12 are substantially flat in the illustrated embodiment of the invention, but need not necessarily be flat.

The first means 13 for supporting the holder 10 is situated adjacent to the marginal portion of the first food receiving surface 11, the second means 14 for supporting said holder 10 is situated at an intermediate portion of the second food receiving surface 12, and said first and second means 13 and 14 are at opposite sides of the holder. Each of the first and second means 13 and 14 can be secured to the holder 10, up against the food receiving surface, 11 or 12 as the case may be, at the corresponding side of the holder, in any suitable and convenient manner. In the disclosure as made, all of the elements of the serving utensil are of substantially transparent plastic or composition material, and the supporting means 13 and 14 are integrally connected to said holder 10 at the locations of its oppositely disposed food receiving surfaces 11 and 12.

Said first supporting means 13 is situated in substantially spaced relation to an intermediate portion of the first food receiving surface 11, as well as in adjacent relation to the marginal portion of said first food receiving surface. Thus, when the holder 10 is supported by the second supporting means 14 with its first food receiving surface 11 facing upwardly there will be a food receiving area of said first food receiving surface disposed interiorly of the first supporting means 13. Said second supporting means 14 is situated in substantially spaced relation to the marginal portion of the second food receiving surface 12, as well as at an intermediate portion of said second food receiving surface. Thus, when said holder 10 is supported by the first supporting means 13 with its second food receiving surface 12 facing upwardly there will be a food receiving area of said second food receiving surface disposed exteriorly of the second supporting means 14. The food receiving area of the first food receiving surface 11 is at and adjacent to the intermediate portion of said first food receiving surface, as well as disposed interiorly of the first supporting means 13, and the food receiving area of the second food receiving surface 12 is at and adjacent to the marginal portion of said second food receiving surface, as well as disposed exteriorly of the second supporting means 14.

As shown, each of the first and second supporting means 13 and 14 is constituted as a series or plurality of spaced apart receivers or candlesticks for removably mounting candles upon the first and second oppositely disposed food receiving surfaces, respectively, of the holder 10. More explicitly, the first supporting means 13 consists of spaced apart receivers or candle-sticks, each designated 15, circumferentially disposed about the first food receiving surface 11, and the second supporting means 14 consists of spaced apart receivers or candle-sticks, each indicated 16, circumferentially disposed on an intermediate portion of the second food receiving surface 12. Connectors, denoted 17 and 18, respectively, extend between pairs of receivers or candle-sticks 15 and 16.

The construction and arrangement desirably will be such that the first and second oppositely disposed food receiving surfaces 11 and 12 will lie in parallel planes, and also such that all of the elements which constitute the first supporting means 13 will include outer or free surfaces lying in a single plane parallel with the holder 10 at the side thereof adjacent to the food receiving surface 11 and that all of the elements which constitute the second supporting means 14 will include outer or free surfaces lying in a single plane parallel with said holder 10 at the side thereof adjacent to the food receiving surface 12.

What is claimed is:

1. A reversible serving utensil consisting of a flat plate having first and second oppositely disposed surfaces each adapted to be capable of receiving articles of food, a first set of raised candle sticks circumferentially mounted on a marginal portion of said first surface, and a second set of raised candle sticks circumferentially mounted on an intermediate portion of said second surface, said first set of candle sticks being adapted to support said serving utensil when the second surface is in a position to receive articles of food, and said second set of candle sticks being adapted to support said serving utensil when said first surface is in a position to receive articles of food.

2. The combination as specified in claim 1 wherein said first and second sets of raised candle sticks are constituted as pairs of tubes, each pair of tubes being connected together by a bar integral therewith.

INEZ C. CRIMMINS.

REFERENCES CITED

The following references are of record in the file of this patent:

UNITED STATES PATENTS

| Number | Name | Date |
|---|---|---|
| D. 58,200 | Sailer | June 21, 1921 |
| D. 150,058 | Crimmins | June 29, 1948 |
| 602,730 | Cormeny | Apr. 19, 1898 |
| 1,055,740 | Hafner | Mar. 11, 1913 |
| 1,091,114 | Berthrong | Mar. 24, 1914 |
| 1,185,026 | Urner | May 30, 1916 |
| 1,388,364 | Miller | Aug. 23, 1921 |
| 1,756,963 | Ware | May 6, 1930 |
| 1,771,589 | Strauss | July 29, 1930 |
| 1,935,831 | Cunningham | Nov. 21, 1933 |
| 1,982,723 | Bantleon et al. | Dec. 4, 1934 |
| 2,117,266 | Adams | May 17, 1938 |
| 2,322,519 | Ingebrigtsen | June 22, 1943 |

FOREIGN PATENTS

| Number | Country | Date |
|---|---|---|
| 273,422 | Great Britain | July 7, 1927 |
| 296,544 | Great Britain | Sept. 6, 1928 |